(12) United States Patent
Field et al.

(10) Patent No.: US 8,599,725 B2
(45) Date of Patent: Dec. 3, 2013

(54) REPRESENTING AND SEARCHING NETWORK MULTICAST TREES

(75) Inventors: Brian E. Field, Evergreen, CO (US); Brice Cox, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 295 days.

(21) Appl. No.: 13/029,485

(22) Filed: Feb. 17, 2011

(65) Prior Publication Data

US 2011/0134918 A1 Jun. 9, 2011

Related U.S. Application Data

(63) Continuation-in-part of application No. 12/049,511, filed on Mar. 17, 2008, now Pat. No. 8,259,594.

(51) Int. Cl.
- H04L 12/28 (2006.01)
- H04N 7/16 (2011.01)
- G06F 15/16 (2006.01)

(52) U.S. Cl.
USPC ........... 370/270; 370/389; 370/486; 725/143; 726/15

(58) Field of Classification Search
None
See application file for complete search history.

(56) References Cited

U.S. PATENT DOCUMENTS

| | | |
|---|---|---|
| 7,035,217 B1 | 4/2006 | Vicisano |
| 7,269,536 B1 | 9/2007 | Gross et al. |
| 7,474,632 B2 | 1/2009 | Ban |
| 2004/0088309 A1* | 5/2004 | Koh et al. ............... 707/100 |
| 2005/0146426 A1 | 7/2005 | Pereira et al. |
| 2005/0204042 A1* | 9/2005 | Banerjee et al. ......... 709/226 |
| 2006/0114904 A1* | 6/2006 | Lee ........................ 370/390 |
| 2006/0159050 A1* | 7/2006 | Kim et al. ............... 370/331 |
| 2006/0245364 A1 | 11/2006 | Zhu et al. |
| 2007/0147371 A1* | 6/2007 | Radha et al. ............. 370/390 |
| 2007/0177523 A1 | 8/2007 | Nagami et al. |
| 2007/0225926 A1 | 9/2007 | Gross et al. |
| 2008/0175172 A1* | 7/2008 | Nishi ...................... 370/256 |
| 2008/0225770 A1* | 9/2008 | Cho et al. ............... 370/312 |
| 2008/0298229 A1 | 12/2008 | Ballantyne et al. |
| 2009/0034689 A1* | 2/2009 | Wahl et al. .............. 379/1.03 |
| 2009/0158096 A1 | 6/2009 | Ali et al. |
| 2009/0232007 A1 | 9/2009 | Field |

OTHER PUBLICATIONS

EP Extended Search Report, 09250746.6, dated Jul. 13, 2009.
Srinivasan Jagannathan et al., "Using Tree Topology for Multicast Congestion Control," 2001 IEEE, pp. 313-320.
Youngsu Chae et al., "Exposing the network: Support for Topology-sensitive Applications," IEEE Openarch 2000, pp. 65-74.
Ramon Caceres, et al., "Impromptu measurement Infrastructures Using RTP," IEEE INFOCOM 2002, pp. 1490-1499.

(Continued)

Primary Examiner — Chi Pham
Assistant Examiner — Soon-Dong D Hyun
(74) Attorney, Agent, or Firm — Banner & Witcoff, Ltd.

(57) ABSTRACT

Methods and systems are disclosed for receiving data from each of a plurality of components in a network, the components being arranged as a plurality of multicast trees, the data from each of the components indicating a structure of a portion of the network and at least one attribute associated with the respective component. The disclosure further provides for determining, based on the data, a structure of at least some of the multicast trees, receiving search criteria, and determining which of the multicast trees meet the search criteria.

20 Claims, 7 Drawing Sheets

(56) References Cited

OTHER PUBLICATIONS

Agisilaos-Georgios P. Ziotopoulos, et al., "Estimation of Network Link Loss Rates Via Chaining in Multicast Trees," IEEE 2001, pp. 2517-2520.

Individual Submission W Fenner AT&T Research S Casner Packet Design: "A traceroute facility for IP Multicast.; draft-fenner-traceroute-ipm-01.txt", IETF Standard Working Draft, Internet Engineering Task Force, IETF, CH, No. 1, Feb. 11, 2005.

Anoop Reddy, et al., "Large-Scale Fault Isolation," IEEE Journal on Selected Areas in Communications, vol. 18, No. 5, May 2000.

* cited by examiner

REPRESENTING AND SEARCHING NETWORK MULTICAST TREES

BACKGROUND

A service provider network (such as a data network) may include a number of multicast trees for delivering content such as video and/or audio data to various users. Any given multicast tree in the network may include one or more content receivers operably coupled to one or more routers and one or more transmission sources. The receivers, routers, and transmission sources may be coupled to each other via links (e.g., wireless and/or wired links, such as optical fiber links), which may span large distances. The transmission source may transmit content as one or more data streams to the routers via the links. The routers, in turn, direct the data stream over the links to other routers or various receivers. Thus, a multicast tree defines one or more paths extending from a source to one or more receivers.

The size of the multicast trees may be large and may continue to grow with the advent of new or additional services, such as switched digital video (SDV). SDV networks are known to dynamically transmit only a subset of available video streams, based on which of the video streams are selected by the users at any given time. Where a network is designed to multicast content to large numbers of users spread across large geographical regions, it is not unusual for the network to contain thousands of different multicast trees at any given time. In general, the larger a network becomes, the more challenging it is to for service providers to maintain and/or troubleshoot the network.

SUMMARY

When troubleshooting errors that may be present in multicast trees within a network, it may be useful for a service provider (e.g., a service technician) to search the multicast trees of one or more networks for certain attribute characteristics. The attributes may relate to, e.g., the structure of the multicast trees and/or the data being transmitted by the multicast trees.

The types of searches that service technicians may want to perform in the network may include, for example, but are not limited to, (i) determining which one or more multicast groups are sourced from a particular source, (ii) determining which one or more multicast groups arrive on a particular interface of a router and/or on a particular router, (iii) determining which one or more multicast trees carry a particular service (e.g., a particular video stream or other data stream), and (iv) determining those one or more multicast groups in which the packet per second rate as measured by routers in the associated multicast trees differs by a predetermined configurable amount. It may also be desirable and helpful to generate and display a visual rendering of an electronic representation of one or more of the multicast trees in the network. Accordingly, various illustrative methods, systems, and software are disclosed for, e.g., receiving data from each of a plurality of components in a network, the components being arranged as a plurality of multicast trees, the data from each of the components indicating a structure of a portion of the network and at least one attribute associated with the respective component. Further the disclosure provides for determining, based on the data, a structure of at least some of the multicast trees, receiving search criteria, and determining which of the multicast trees meet the search criteria, based on the attributes associated with the components and the determined structure.

Also, various illustrative methods, systems, and software are disclosed for determining, based on a plurality of data messages, a structure of a plurality of multicast trees in a network that comprises a plurality of components, each of the data messages indicating a structure of a different portion of the network and at least one attribute associated with at least one of the components of the network, and determining which of the multicast trees meet search criteria, based on the attributes and the determined structure.

As another example, illustrative systems are disclosed, that comprise a computer configured to receive a plurality of data messages from a network, the network comprising a plurality of components arranged as a plurality of multicast trees, each of the data messages indicating a structure of a different portion of the network and at least one attribute associated with at least one of the components of the network; and a non-transitory computer-readable medium. The computer may be configured to determine, based on the plurality of data messages, a structure of at least some of the multicast trees, store, in the non-transitory computer-readable medium, a logical representation of the determined structure of the at least some of the multicast trees, and determine which of the multicast trees meet search criteria, based on the attributes and the stored logical representation.

These and other aspects of the disclosure will be apparent upon consideration of the following detailed description.

BRIEF DESCRIPTION OF THE DRAWINGS

Illustrative embodiments may be best understood by referring to the following detailed description in conjunction with the accompanying drawings, in which.

DETAILED DESCRIPTION

One or more of the illustrative embodiments as described herein may generally provide a system, software, and method for generating a logical representation of multicast trees in a data network. Such a data network may comprise sources, routers and receivers logically arranged as one or more multicast trees to transmit and provide content such as data, and/or such as audio and/or video (A/V) data. The data may be transmitted in the form of one or more data streams. The data may comprise, for instance, time-sensitive data such as any kind of streamed data, to various users. Each multicast tree may provide such data to a particular geographical region and may be characterized by various attributes. Using illustrative systems disclosed herein, a user may be able to search the attributes of each multicast tree. For example, a user may search the service network to determine which multicast trees in the network share one or more attributes. Such a capability may, among other things, assist the user in assessing or troubleshooting various issues that affect the transmission of the data within the network to the user (e.g., customer).

Figure 1:
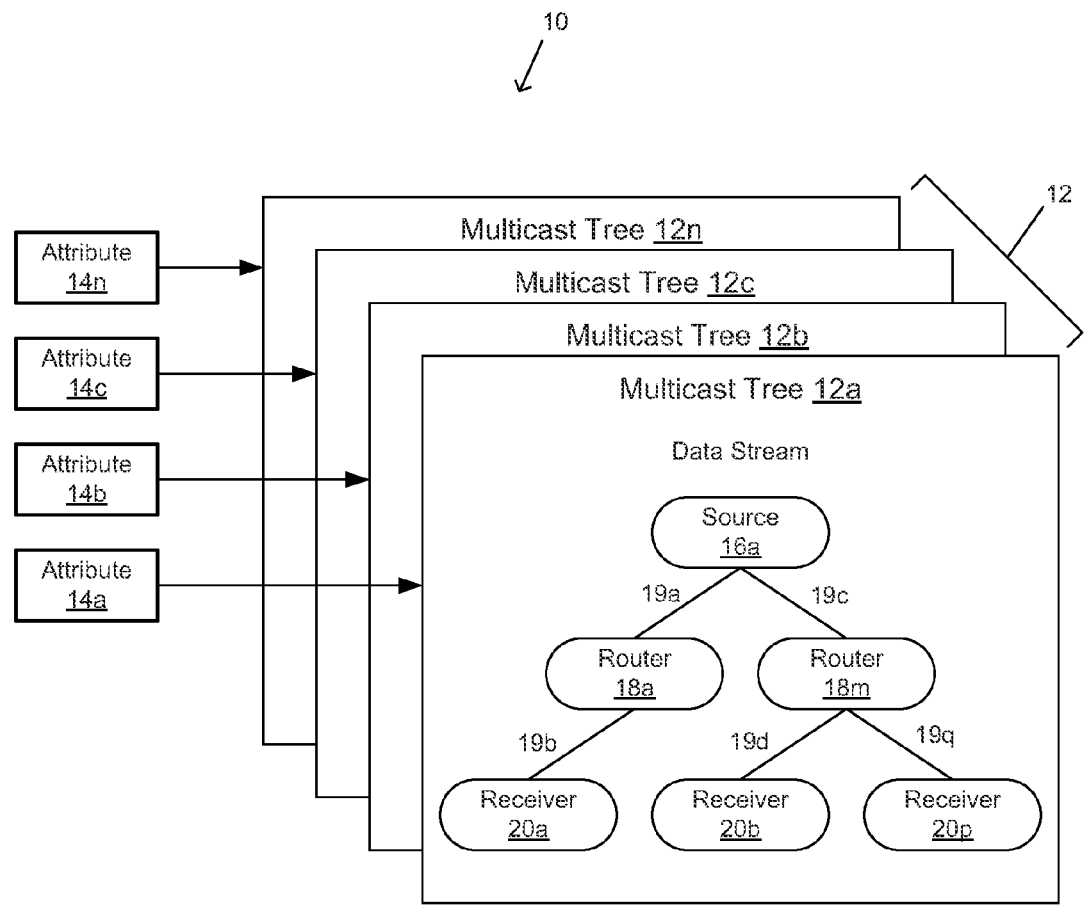
FIG. 1 depicts an example of a plurality of multicast trees and various attributes associated with each tree in a data network.

FIG. 1 depicts an example of a plurality of multicast trees 12a-12n (which hereafter may be referred to collectively as one or more multicast trees 12) and various attributes 14a-14n (which hereafter may be referred to collectively as one or more attributes 14) associated with one or more, or each, of the trees 12 in a data network 10. Each multicast tree may be arranged such that data from a source is replicated along multiple paths in the network to a plurality of receivers. Because the demands on the network may change from time to time (e.g., due to user requests and/or errors occurring in the network), the multicast trees may change to address such demands. For instance, a device such as one or more receivers, links, routers, and/or sources may be added, exchanged, or removed from a multicast tree at any given time. Or, a multicast tree may come into existence or cease to exist at any given time. Such changes may not necessarily involve physical changes to the links, but rather may simply involve logical changes to paths that define the set of sources, links, routers, and receivers in the multicast tree. There is a changing nature of the multicast trees, and so searchable attributes of the multicast trees may be collected and updated periodically.

For any given network, a service provider may provide various types of content to the plurality of multicast trees 12. Each multicast tree may be designated to transmit the content (e.g., A/V data) to, for example, receivers in a specific geographical region within a particular country. Each multicast tree 12 may include at least one transmission source 16 (e.g., multicast tree 12a has source 16a, multicast tree 12b has source 16b, . . . and multicast tree 12n has source 16n). The transmission source 16 for a given tree may be adapted to generate the content data, which may comprise a plurality of packets. In the case of A/V data, each packet may include video or audio data (or both).

The data (e.g., A/V data and/or other data) may also include control information to instruct elements in the multicast tree 12 (e.g., the routers 18), for example, how to control the flow of the data to a particular receiver 20 (e.g., a user device). In one example, the control information may correspond to data that is sent to a particular receiver 20 to enable various services. For example, the control information may identify a command to cause the particular receiver 20 to receive and visually present HBO programming in the event the user decides to view HBO programming, or to add HBO programming to his/her existing service plan.

A plurality of routers 18a-18m may be configured to receive the data from each source 16a-16n, respectively, and to forward the received data to a next component in the associated path of the multicast tree. A plurality of receivers 20a-20p are coupled to the routers 18a-18m via links 19 (e.g., wired and/or wireless links). In the illustrated example, each tree 12a-12n includes one or more receivers 20a-20p and one or more routers 18a-18m, where each of n, m, and p may be any number equal to or greater than one, and may be the same or different numbers from each other. Also, the numbers of receivers and routers may be different for each of the trees 12.

In the illustrated example, the router 18a of tree 12a directs the data to the receiver 20a, and the router 18n of tree 12a directs the data to the receivers 20b and 20p. The receivers 20a-20p are configured to present the data to an end user (e.g., the customer), such as on a display (e.g., television set, mobile device, or monitor) for viewing, and/or to a memory such as a hard drive or other computer-readable medium for storage. The source 16a, routers 18a-18m, and receivers 20a-20p may comprise multicast components within the multicast tree 12a and may cooperate with each other to transmit the data to the appropriate receivers 20. In general, all references made specifically to the multicast tree 12a or any portion thereof may apply to any of the multicast trees 12b-12n or any portion thereof. For example, each multicast tree 12b-12n may include any number of multicast components such as a transmission source, routers, and receivers. It is understood that each multicast tree 12a-12n may include different or equal numbers of sources, routers, and receivers from one another, and may or may not overlap such that they share at least some of the same sources, routers, links and/or receivers. Further, the particular arrangement of the sources, routers, and receivers may vary or be similar to one another for each multicast tree 12a-12n.

Multicast components (e.g., 16, 18a-18m, and 20a-20p) in the multicast trees 12a-12n may be communicatively coupled together either directly or indirectly, such as via a plurality of links 19a-19q, which may be implemented at the physical layer as, e.g., electrical, electromagnetic, and/or optical connections. Any of links 19a-19q may be wired or wireless links. With respect to the example multicast tree 12a, for example, the source 16a and the router 18a are coupled together via the link 19a, the router 18a and the receiver 20a are coupled together via the link 19b, the source 16a and the router 18n are coupled together via the link 19c, the router 18n and the receiver 20b are coupled together via the link 19d, and the router 18n and the receiver 20n are coupled together via the link 19q. In general, multicast components may transmit the data originating from the respective source 16 to the next multicast component downstream in the trees 12a-12n via a corresponding one of links 19.

The coupling of each receiver 20 to the source 16 via a particular router 18 (and multiple links 19) is referred to herein as a path. In the simplified example of FIG. 1, the multicast tree 12a includes a total of three paths. The source 16a, the link 19a, the router 18a, the link 19b, and the receiver 20a form a first path. The source 16a, the link 19c, the router 18n, the link 19d, and the receiver 20b form a second path. The source 16a, the link 19c, the router 18n, the link 19q, and the receiver 20n form a third path. In general, each multicast tree 12a-12n is adapted to include one or more paths for transmitting a data stream to a receiver 20 for consumption (e.g., viewing and/or storage). Each link or path within a corresponding multicast tree 12a-12n may be physically short or long, for instance even spanning thousands of kilometers, and may be embodied as one or more physical connections of the same type or of different types.

A plurality of attributes 14a-14n are associated with the multicast trees 12a-12n, and these attributes may be stored as data such as in a database. Each attribute 14a-14n may identify one or more characteristics of the multicast trees 14, or any portion thereof. Furthermore, some or all of the attributes 14 may be associated with various particular geographic regions. For example, the attributes 14a may identify one or more characteristics with respect to the data in multicast tree 12a whose viewers are situated in Grand Rapids, Mich. Such identified characteristics may include, for instance, one or more channel types (e.g., ESPN, HBO, etc.), a particular type of video encoding (e.g., high definition or standard definition, MPEG2/MPEG4), transmission rules (e.g., local events such as, but not limited to, televised athletic events of interest to subscribers in the Grand Rapids area, and content which has been processed to include commercials of merchants local to the Grand Rapids area, etc). The attributes 14a for a given multicast tree or portion thereof may also include, for example, an identification as to whether the data in that multicast tree is (i) variable bit-rate encoded or constant bit-rate encoded, (ii) a single program transport stream (SPTS) or a multiple program transport stream (MPTS), and/or (iii) encrypted (and if so, an identification of the type of encryption used). It is contemplated that the other such attributes 14b-14n may each identify characteristics with respect to the A/V data and/or other data for multicast trees 12b-12n, respectively, and may identify any one or more of the items discussed herein in connection with the attributes 14a.

Figure 2:
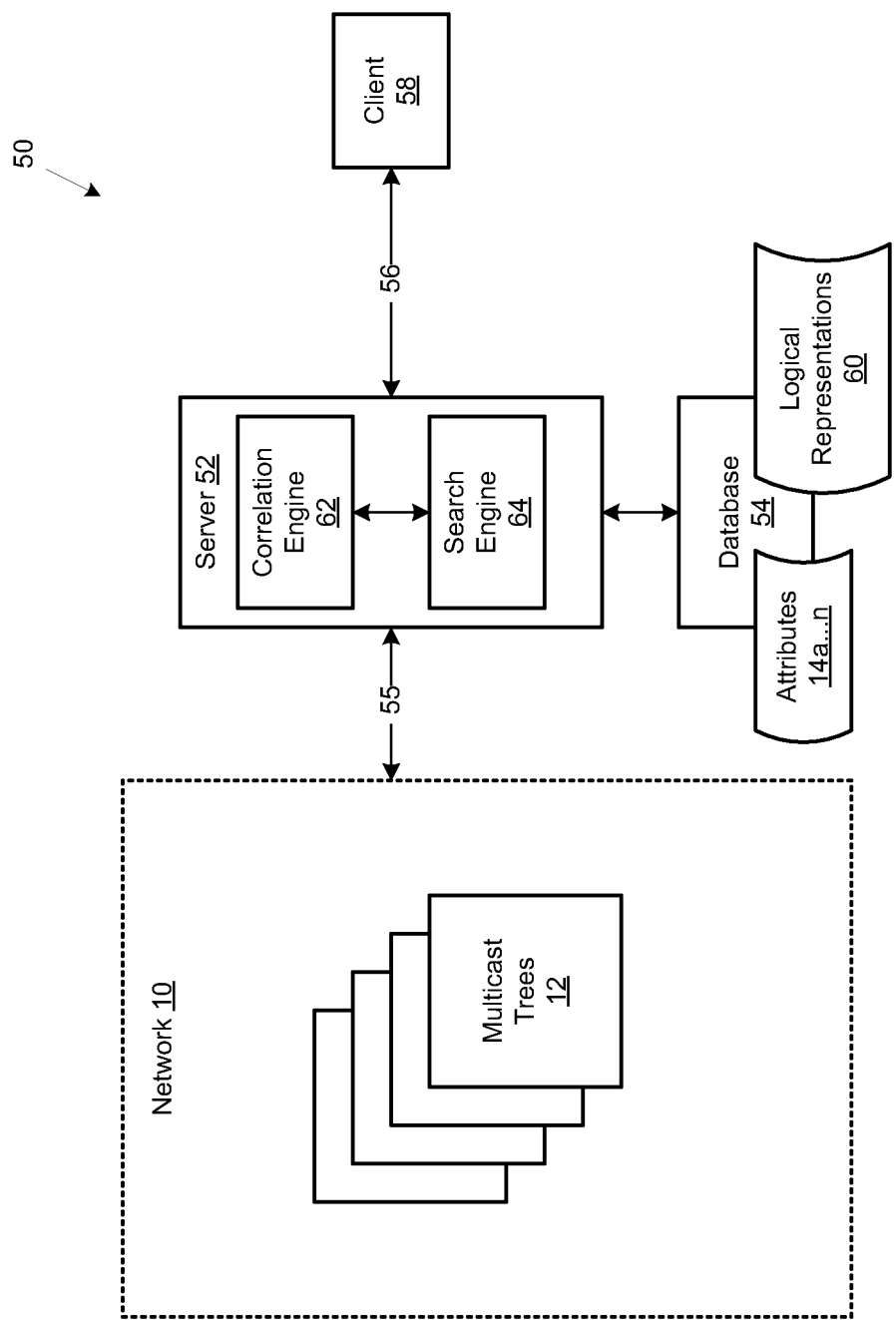
FIG. 2 depicts a block diagram of an illustrative system for generating a logical representation of one or more of the plurality of multicast trees in a data network and for searching attributes of one or more of the trees, in accordance with one or more aspects of the disclosure.

FIG. 2 is a block diagram of an illustrative system 50 for generating a logical representation, or model, of the plurality of multicast trees 12a-12n and for searching one or more of the trees 12a-12n in the data network 10. The system 50 is configured to generate a logical representation 60 (e.g., a computer-readable set of data and/or a visible and displayable rendering) of any one or more of the multicast trees 12a-12n. This logical representation of the multicast trees 12a-12n may be stored, for instance, as data on a computer-readable medium, such as but not limited to one or more magnetic discs and/or tapes, one or more optical discs, solid-state memories, and/or one or more memory chips. In some embodiments, logical representation 60 may be stored in a database 54. The system 50 in this example is communicatively coupled to data network 10 and includes a server 52, database 54 or other storage that may include or be implemented as at least a portion of the above-mentioned computer-readable medium, a first communication link 55, a second communication link 56, and a client 58. The server 52 is communicatively coupled to the data network 10 via the first communication link 55 and may generate or cause the generation of the logical representation 60 of any one or more of the multicast trees 12a-12n based, for example, on data received by various components within the multicast trees 12a-12n. In some aspects, the server 52 is configured to generate and transmit the logical representation 60 to the client 58 via the second communication link 56 so that a user is capable of viewing a displayed rendering of the logical representation in a visual format, such as on a display of the client 58. The visual format may include, e.g., textual and/or graphical information. The server 52 in this example may include hardware (e.g., a processor), software or any combination thereof for processing computer-executable instructions to generate and transmit data describing the logical representation 60 to the client 58. The first and second communication links 55 and 56 may be implemented, for example, wired and/or wirelessly using Transmission Control Protocol/Internet Protocol (TCP/IP) to facilitate data communication between the server 52 and the client 58.

The server 52 may implement (such as in software) a correlation engine 62 that communicates with the routers 18a-18m within each multicast tree 12a-12n via the first communication link 55. Each router 18a-18m includes one or more interfaces for receiving incoming multicast packets of data and for transmitting outgoing multicast packets of data. The correlation engine 62 may receive an identification data message from each router 18, in which the identification data may identify which interface of the respective router 18 is an incoming interface (e.g., an interface that receives data, such as a physical or logical data port) and/or which interface is an outgoing interface (e.g., an interface that transmits data, such as a physical or logical data port). A given interface may also be a bi-directional interface that can both receive and transmit data. Thus, the identification data from each of the routers 18a-18m represents a local view (or perspective) of the multicast tree 12 of which it is a part, from the point of view of the respective router. These local views, each representing a relatively small portion of the multicast tree structure, may be combined, e.g., connected, together to form a representation of entire multicast tree structure (or at least of a greater portion of the multicast tree structure). The correlation engine 62, which may be configured to form a representation from the plurality of local views, is also configured to periodically query each of the routers 18a-18m in any given multicast tree 12a-12n so that each router 18a-18m transmits, in response, the respective identification data. In one example, the correlation engine 62 may query each of the routers 18a-18m every X time period (where X may be, for example, 20 minutes or less, or between twenty minutes and two hours, or greater than two hours) so that each router 18a-18m in response to the query transmits the identification data. In some embodiments, the queries may be made one at a time for each of the routers. In other embodiments, the queries may be made in parallel to multiple ones of the routers simultaneously. Queries may be conducted at, for example, random or pre-specified time intervals. The particular time interval used to query the routers 18a-18m may be user-selectable (or automatically selected) depending upon the desired criteria of a particular implementation, the size of network 10, and/or the expected size and/or number of multicast trees 12. Additionally or alternatively, the routers 18a-18m may transmit the identification data spontaneously (e.g., periodically) and not necessarily responsive to a query. In either case, the identification data may be sent directly to server 52 and/or via an intermediate device that collects the identification data and provides information from the received identification data to server 52.

The correlation engine 62 may assemble the local views determined from the information provided by the identification data from each router 18a-18n into a single end-to-end logical representation (e.g., from source to receiver across each path) for some or all of multicast trees 12a-12n. In response to generating the logical representation for each multicast tree, the correlation engine 62 may determine the number of packets lost in those paths, such as due to network errors. Such packet loss may cause the occurrence of video tiling that may impair the visual data at one or more of the receivers 20a-20p.

The routers 18a-18m in this example may be configured to provide the identification data by executing, for example, a protocol independent multicast (PIM) and an internet group membership protocol (IGMP). IGMP is a known signaling protocol that may be used by any one or more of the receivers 20 to express interest in a particular multicast group to a corresponding router. The routers 18a-18m may also use PIM in a known way to build the respective multicast tree 12 from the receivers 20 back to the transmission source 16.

Each router 18 may also be configured such that the identification data includes data regarding various attributes 14, such as data identifying the multicast stream packet rate as reported by each respective router. The packet rate may be represented in units of, e.g., packets per second (pps). Each router 18 may compute the packet rate over a sliding window, such as a window of a less than three seconds in length, or longer. The server 52 may query each router 12 for such information. In theory, for a constant bit rate (CBR) source 16, it would be expected that all routers 12 receiving data from that source 16 would report similar packet rates in the same multicast tree 12. If there is a significant difference in the packet rates reported by the routers 12, then such a condition may indicate one or more points in the network 10 where a problem may exist. For instance, if a router reports 1000 pps and another router downstream from that router in the same path of a multicast tree reports 0 pps, such a condition may be indicative of an issue between those two routers. This condition may be interpreted to mean that devices and subscribers downstream of the condition have lost access to the A/V content. More subtle differences in packet rate information across routers in a multicast tree could indicate other network problems that result in poor A/V quality.

Correlation engine 62 may generate the logical representation by piecing together the local views from the various routers 18 into a larger logical end-to-end picture. The logical representation may be represented in any manner desired. For example, the logical representation may include at least the following information (which will be discussed further below):

```
(69.141.129.194,        232.137.16.16)→{Gig1/14}
    ur01.albuquerque.nm.albuq    {Gig1/13}→{      }
    88.68.1.163
(69.141.129.194,        232.137.16.16)→{Gig1/14}
    ur01.albuquerque.nm.albuq    {Gig4/17}→{      }
    69.141.188.86
(69.141.129.194,        232.137.16.16)→{Gig1/14}
    ur02.albuquerque.nm.albuq    {Gig1/13}→{      }
    88.68.1.163
(69.141.129.194,        232.137.16.16)→{Gig1/14}
    ur02.albuquerque.nm.albuq    {Gig4/17}→{      }
    69.141.188.90
(69.141.129.130,        232.149.16.16)→{Gig1/10}
    ur02.albuquerque.nm.albuq    {Gig1/22}→{      }
    192.168.2.34
(69.141.181.238,        232.196.38.128)→{Gig1/45}
    ur08.cmc.co.ndcwest          {Ten4/4}→{Ten3/1}
    ar02.cmc.co.ndcwest          {Ten2/4}→{Ten4/1}
    cr01.denverqwest.co.cbone    {Ten7/3}→{Ten9/4}
    ar01.albuquerque.nm.albuq    {Ten8/4}→{Ten9/1}
    ur01.albuquerque.nm.albuq    {Gig2/27}→{      }
    69.141.188.6
(69.141.181.238,        232.196.38.128)→{Gig1/45}
    ur08.cmc.co.ndcwest          {Ten4/4}→{Ten3/1}
    ar02.cmc.co.ndcwest          {Ten2/4}→{Ten4/1}
    cr01.denverqwest.co.cbone    {Ten1/1}→{Ten2/1}
    cr01.santateresa.tx.cbone    {Ten7/1}→{Ten9/4}
    ar02.albuquerque.nm.albuq    {Ten8/4}→{Ten9/1}
    ur02.albuquerque.nm.albuq    {Gig2/3}→{      }
    69.141.188.14
(69.141.181.238,        232.196.38.128)→{Gig1/45}
    ur07.cmc.co.ndcwest          {Ten4/1}→{Ten3/1}
    ar01.cmc.co.ndcwest          {Ten5/3}→{Ten6/3}
    ar01.potomac.co.ndcwest      {Ten1/1}→{Ten3/3}
    cr01.denver.co.cbone         {Ten8/1}→{Ten2/1}
    cr01.stratford.tx.cbone      {Ten9/1}→{Ten1/1}
    cr01.dallas.tx.cbone         {Ten9/1}→{Ten1/1}
    cr01.nashville.tn.cbone      {Ten9/1}→{Ten1/1}
    cr01.atlanta.ga.cbone        {Ten4/1}→{Ten0/8/0/6}
    crs01.b0atlanta.ga.atlanta   {Bun20}→{Port2}
    ur01.B0atlanta.ga.atlanta    {Gig2/18}→{      }
    69.140.144.10
(69.141.180.130,        232.196.38.1)→{Gig3/8}
    ur08.cmc.co.ndcwest          {Ten4/4}→{Ten3/1}
    ar02.cmc.co.ndcwest          {Ten2/4}→{Ten4/1}
    cr01.denverqwest.co.cbone    {Ten7/3}→{Ten9/4}
    ar01.albuquerque.nm.albuq    {Ten8/4}→{Ten9/1}
    ur01.albuquerque.nm.albuq    {Gig2/25}→{      }
    69.141.188.2
(69.141.180.130,        232.196.38.1)→{Gig3/8}
    ur08.cmc.co.ndcwest          {Ten4/4}→{Ten3/1}
    ar02.cmc.co.ndcwest          {Ten2/4}→{Ten4/1}
    cr01.denverqwest.co.cbone    {Ten7/3}→{Ten9/4}
    ar01.albuquerque.nm.albuq    {Ten8/4}→{Ten9/1}
    ur01.albuquerque.nm.albuq    {Gig4/10}→{      }
    88.68.1.164
(69.141.180.130,        232.196.38.1)→{Gig3/8}
    ur08.cmc.co.ndcwest          {Ten4/4}→{Ten3/1}
    ar02.cmc.co.ndcwest          {Ten2/4}→{Ten4/1}
    cr01.denverqwest.co.cbone    {Ten1/1}→{Ten2/1}
    cr01.santateresa.tx.cbone    {Ten7/1}→{Ten9/4}
    ar02.albuquerque.nm.albuq    {Ten8/4}→{Ten9/1}
    ur02.albuquerque.nm.albuq    {Gig2/1}→{      }
    69.141.188.10
(69.141.180.130,        232.196.38.1)→{Gig3/8}
    ur07.cmc.co.ndcwest          {Ten4/1}→{Ten3/1}
    ar01.cmc.co.ndcwest          {Ten5/3}→{Ten6/3}
    ar01.potomac.co.ndcwest      {Ten1/1}→{Ten3/3}
    cr01.denver.co.cbone         {Ten8/1}→{Ten2/1}
    cr01.stratford.tx.cbone      {Ten9/1}→{Ten1/1}
    cr01.dallas.tx.cbone         {Ten9/1}→{Ten1/1}
    cr01.nashville.tn.cbone      {Ten9/1}→{Ten1/1}
    cr01.atlanta.ga.cbone        {Ten4/1}→{Ten0/8/0/6}
    crs01.b0atlanta.ga.atlanta   {Bun20}→{Port2}
    ur01.B0atlanta.ga.atlanta    {Gig2/21}→{      }
    192.79.170.14
(69.141.180.130,        232.196.38.1)→{Gig3/8}
    ur07.cmc.co.ndcwest          {Ten4/1}→{Ten3/1}
    ar01.cmc.co.ndcwest          {Ten5/3}→{Ten6/3}
    ar01.potomac.co.ndcwest      {Ten1/1}→{Ten3/3}
    cr01.denver.co.cbone         {Ten8/1}→{Ten2/1}
    cr01.stratford.tx.cbone      {Ten9/1}→{Ten1/1}
    cr01.dallas.tx.cbone         {Ten9/1}→{Ten1/1}
    cr01.nashville.tn.cbone      {Ten9/1}→{Ten1/1}
    cr01.atlanta.ga.cbone        {Ten4/1}→{Ten0/8/0/6}
    crs01.b0atlanta.ga.atlanta   {Bun20}→{Port2}
    ur01.B0atlanta.ga.atlanta    {Gig1/9}→{ } 69.140.144.2
...
...
```

In the above example, the first value in each parentheses represents a source IP address and the second value in each parentheses represents a multicast destination group IP address. Together, this pair of IP addresses identities a multicast tree. For instance, one multicast tree listed above is identified as the pair 69.141.129.194, 232.137.16.16, and another multicast tree listed above is identified as the pair 69.141.180.130, 232.196.38.1. In this example, there may be multiple entries for each multicast tree, each entry representing a different path in the multicast tree. The illustrative logical representation as shown above also includes an ordered series of router interfaces (indicated in { } brackets, such as "{Gig1/14}") and routers (such as "ur01.albuquerque.nm.albuq"). This ordered list indicates the direction and location of each path in the multicast trees. Of course, the logical representation may be represented in any manner desired, as long as the logical representation contains desired information about multicast tree structure.

In addition to the above information, correlation engine 62 may cause the logical representation to further include or otherwise be associated with the various attributes 14 represented by the received identification data. Thus, one or more of the attributes 14 may be associated with any of the routers and/or paths in the logical representation of the multicast trees.

The database 54 may store the logical representation of the multicast tress and/or the information identifying or otherwise representing the attributes 14 as collected by correlation engine 62. Alternatively or additionally, data identifying or otherwise representing the attributes 14a-14n may be stored locally at a corresponding one or more of the sources 16. In such a case, when performing a search, the server 52 (e.g., using a search engine 64, as discussed below) may actively pull the attributes 14 from the sources 16, rather than from the database 54. In either case, the attributes 14 may be stored in such a manner that they are associated with, or can otherwise be correlated to, the multicast trees or portions thereof having the respective attributes 14.

The server 52 may also implement search engine 64 to search the stored attributes based on various search criteria, and to return results of the search with and identification of which of the multicast trees 12 or portions thereof meet the search criteria. The user may access the search engine 64 to enter the search criteria via the client 58. For example, the user may access a URL via an internet connection (or through one or more other public and/or private networks) with the client 58 and enter data corresponding to the various search criteria that is provided to the search engine 64. Responsive to receiving the search criteria, the search engine 64 may search through the attributes 14 (which may be stored in database 54) to locate those multicast trees and/or portions thereof having the attributes 14 that meet the search criteria.

The following are non-limiting examples of search criteria and/or queries that may be searched on:
- determine which multicast trees are sourced from a location A, and arrive on an interface B of router C;
- determine all multicast trees that carry a particular type of video encoding (e.g., SDV, high-definition video, etc);
- determine which multicast trees carry a particular video service (e.g., ESPN, HBO, etc.);
- determine all multicast trees that originate on a particular router (e.g., router "ur01.newcastle.de.panjde");
- determine all multicast trees that originate on a particular router which are sourced into the router via a particular interface (e.g., gig "6/1");
- determine all multicast trees that are received on a particular router and which transit through another particular router (e.g., through router "ur02.reading.pa.panjde");
- determine all multicast trees that are sourced onto a particular router and that have a receiver on another particular router;
- determine all multicast trees that are received by a particular router on a particular interface;
- determine all multicast trees that ingress through a particular interface on a particular router;
- determine all multicast trees with a particular source IP (e.g., 69.240.11.12);
- determine all multicast trees where the packet rate across routers differs by at least a predetermined value (e.g., differs by 10 pps or more);
- determine all multicast trees having a router where the packet rate is 0;
- determine all multicast trees having a particular data rate (e.g., between 35 and 40 Mb/sec);
- determine all multicast trees having a particular data rate and that are sourced from a particular interface of a particular router;
- determine all multicast trees carrying a particular service (e.g., ESPN) and in which groups are received at a particular location (e.g., statecollege.pa);
- determine all multicast trees that originate in a particular network (e.g., the "panjde" network);
- determine all multicast trees in which there are no receivers for a particular service.
- determine all multicast trees where the packet rates as measured by one or more of the routers 18 differs from each other by at least some predetermined value, are equal to a predetermined value, or are within a predetermined range of values.

As can be seen above from the large variation in the types of example searches that may be performed, the search capability provided by the system 50 may be used in connection with troubleshooting many different types of quality issues involving the delivery of A/V and/or other data to various users. For example, in the event an issue is reported with the delivery of A/V data on the NICKELODEAN channel in a particular city or other particular geographical region, a user may use the search engine 64 to determine which multicast groups carry some or all of the NICKELODEAN feeds into that city or other geographical region. The server 52 may transmit an indication all of the multicast trees 12 that carry the NICKELODEAN feed (e.g., either pre-splice or post-splice feed) into the specified city or other geographical region to the client 58 for visual presentation to the user. The server 52 may also present data to the client 58 corresponding to whether there is any packet loss that is being exhibited within the multicast trees of the multicast group while providing the NICKELODEAN feed.

As can also be seen from the above example searches, the search capability provided by the system 50 may be able to, for instance, take identification data for one or more of the components and use that as part of the search criteria, such that the search criteria specifies a particular one or more of the attributes associated with a particular one or more of the components: e.g., determine all multicast trees that ingress through the a particular interface on a particular router, or, determine all multicast trees that are sourced onto a particular router and that have a receiver on another particular router. As another example, the system 50 may be able to take the identification data for various routers and search for quantitative differences, such that the search criteria specifies a particular quantitative difference between attributes associated with different ones of the components: e.g., determine all multicast trees where the packet rate across routers differs by at least a predetermined value (e.g., differs by 10 pps or more). This latter type of search may be useful, for instance to determine which router may be experiencing overflow, and in response to the search, the system 50 may compute the delta between the various router pps values and report a particular multicast tree if the multicast tree's delta values exceed the search criteria value.

As also seen in some of the above examples, searches may involve criteria that specify a particular path structure, such as one or more particular components, interfaces, sources, tree hierarchy level (e.g., whether a particular router should be the first, ith, or last router in a path). For example: determine all multicast trees with a particular source IP, or determine all multicast trees that are received by a particular router on a particular interface. These types of searches may be possible because the structure of the multicast trees (including the paths) may be logically constructed from the identification data as described herein.

Searches may additionally be performed with criteria that are not related to the attributes 14 provided by the routers. In such a search, the system 50 may compare at least a portion of the search criteria with one or more of the attributes 14 and/or compare at least another portion of the search criteria with information not represented by any of the attributes. For example, if a router is not aware of which particular content is being carried by that router (e.g., ESPN versus ABC), then such information may be stored and obtained separately from the identification data, and the search criteria may include a specified content: e.g., determine all multicast trees carrying a particular service (e.g., ESPN) and in which groups are received at a particular location.

The above searches are examples and are not intended to limit the scope of the search capability provided by the system 50. In general, searches may be performed on any combination or subcombination of various search criteria, including but not limited to criteria specifying a particular source, multicast group, router, hop, link, router interface (ingress and/or egress), receiver, packet rate range, data rate, geographical region, service, network, error rate (e.g., lost packet rate), cumulative errors, and/or port number.

The results of a search request may be presented as, for instance, one or more internet protocol (IP) addresses that are viewable in a web-based format when selected by the user. However, other search result formats may be used. The results may include an identification of at least a portion of the components (e.g., 16, 18, and/or 20) in any given multicast tree 12a-12n. The results may be electronically presented to the user in any manner. The presentation of the search results in an IP based address format, as shown in several of the figures, is provided as an example and is not to be construed as the only manner in which the system 50 is capable of presenting the search results.

While the example of FIG. 2 has been described as being implemented using a server 52, the functions of server 52 (and client 58) may be performed by any other type of computer or by a system or device that includes a computer. Moreover, server 52 and client 58 may be different computers or may be implemented by the same computer. A computer may include any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), tablet computers, set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

Figure 6:
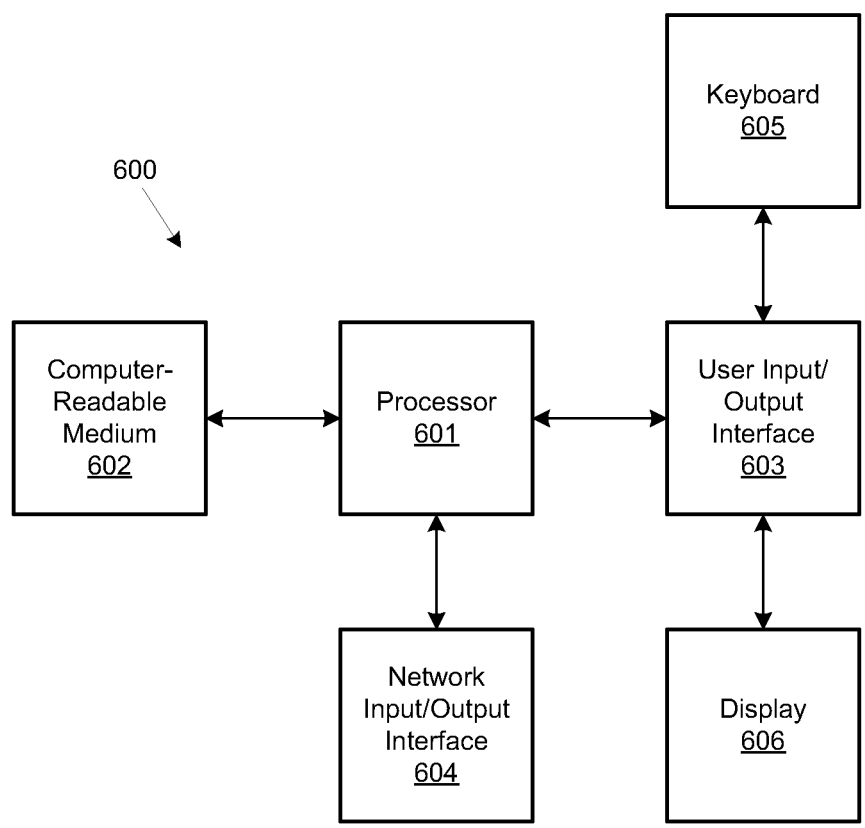
FIG. 6 is a block diagram of an illustrative computer device that may be used to implement elements or methods, in accordance with one or more aspects of the disclosure.

An example block representation of a computer 600 is shown in FIG. 6, via which any of the devices discussed herein may be implemented. Computer 600 may include hardware that may execute software and/or be configured in hardware to perform specific functions. The software may be stored on a computer-readable medium 602 in the form of computer-readable instructions. Computer 600 may read those computer-readable instructions, and in response perform various steps as defined by those computer-readable instructions. Thus, any functions attributed to components 52, 58, 60, 62, and 64 as described herein may be implemented, for example, by reading and executing such computer-readable instructions for performing those functions, and/or by any hardware subsystem (e.g., a processor 601) from which computer 600 is composed.

Computer-readable media include not only a single non-transitory storage medium or single type of such medium, but also a combination of one or more such media and/or types of media. Examples of a computer-readable medium include, but are not limited to, one or more memories, hard drives, solid-state memory devices, optical discs (such as CDs or DVDs), magnetic discs, and magnetic tape drives.

Such a computer-readable medium 602 may store computer-readable instructions (e.g., software) and/or computer-readable data (i.e., information that may or may not be executable). In the present example, computer-readable medium 602 (such as memory and/or hard drive) may be included in any one or more of the devices discussed herein, such as components 52, 58, 60, 62, 64, and/or 54, and may store computer-executable instructions and/or data used by any of those components. Alternatively or additionally, such a computer-readable medium storing the data and/or software may be physically separate from, yet accessible by, any of the devices discussed herein. For example, with regard to server 52, computer-readable medium 602 may include or otherwise represent the data storage medium of database 54, as well as any other memory, hard drives, etc., used by server 52.

Computer 600 may also include a user input/output interface 603 for receiving input from a user (e.g., via a keyboard 605, mouse, and/or remote control) and providing output to the user (e.g., via a display 606, an audio speaker, and/or a printer). Computer 600 may further include a network input/output interface 604 for communicating with other computers or other types of devices, such as via a network or direct connection. Thus, any communication between components 52, 58, 60, 62, 64, and/or 54, and with users, may be attributed to communication via the network input/output interfaces 604 and/or user input/output interfaces 603 of those respective components.

Figure 3:
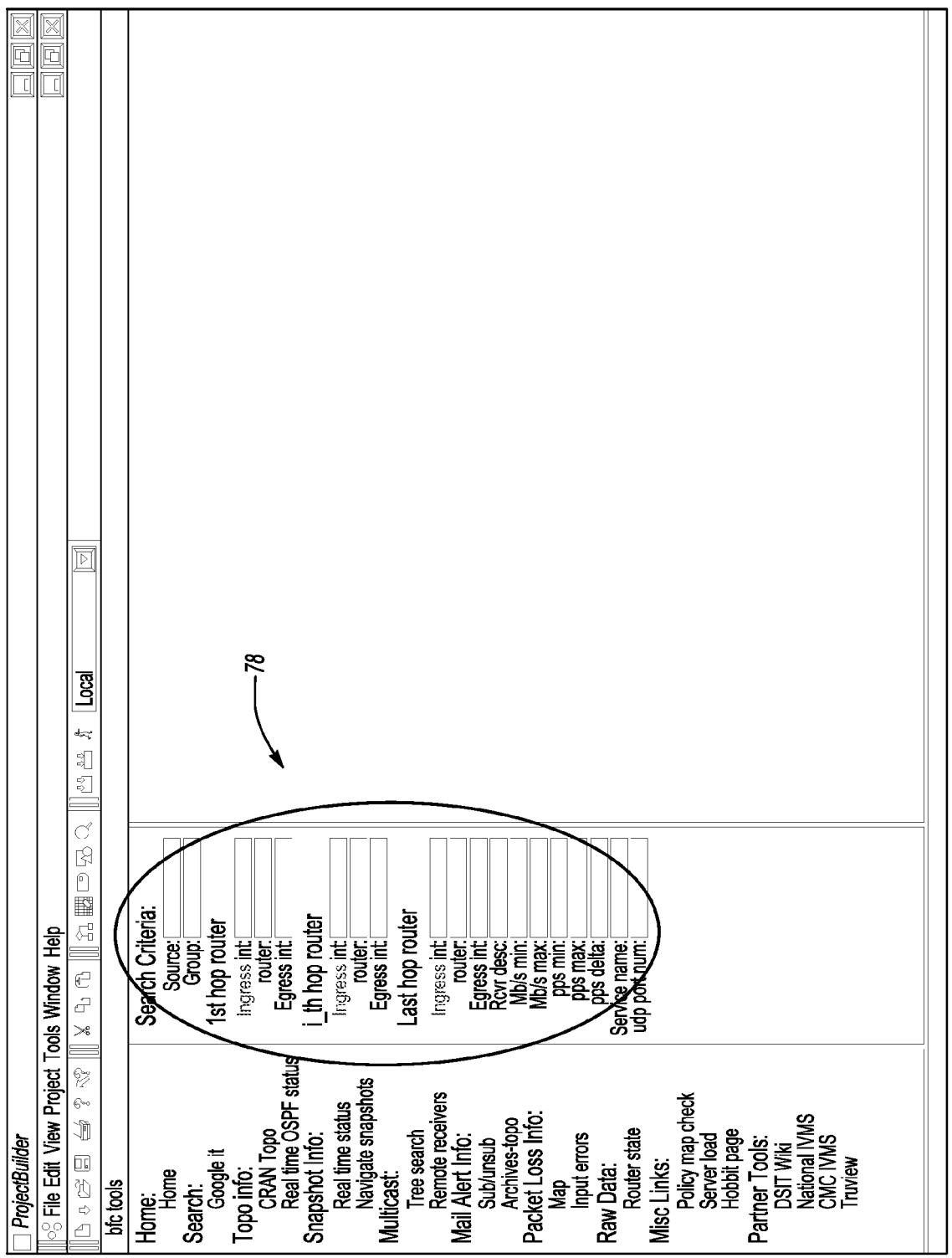
FIG. 3 depicts an illustrative screen display for entering search criteria, in accordance with one or more aspects of the disclosure.

FIG. 3 depicts an example screen display 75 that may be displayed by client 58 (e.g., on display 606 of client 58) and that includes a user interface into which a user may enter search criteria. In this example, the user interface provides various search fields 78 that are each capable of receiving user input, such as in the form of textual input (e.g., via keyboard 605 of client 58), that may be used to search the logical representation 60 of the multicast trees 12. The search fields 78 may include one or more of, for example, a source IP address (or a portion thereof), a multicast group IP address (or portion thereof), a first hop router (that may include ingress interface, router, and/or egress interface), an $i^{th}$ hop router (that may include ingress interface, router, and/or egress interface), a last hop router (that may include ingress interface, router, egress interface, and/or receiver description, a minimum data rate (Mb/s min), a maximum data rate (Mb/s max), a minimum packet rate (pps min), a maximum packet rate (pps max), a difference in packet rates (pps delta), service name, and UDP port value. The user may enter criteria into any one or more of these search fields 78, in any combination or subcombination desired. The client 58 may transmit data representing the inputs that have been entered in the search fields 78 over the second data communication link 56 to the server 52. In response, the server 52 may query the logical representation 60 and the stored attributes 14 in the database 54 to provide the desired search results back to the user, e.g., in electronic form as discussed above.

Figure 4:
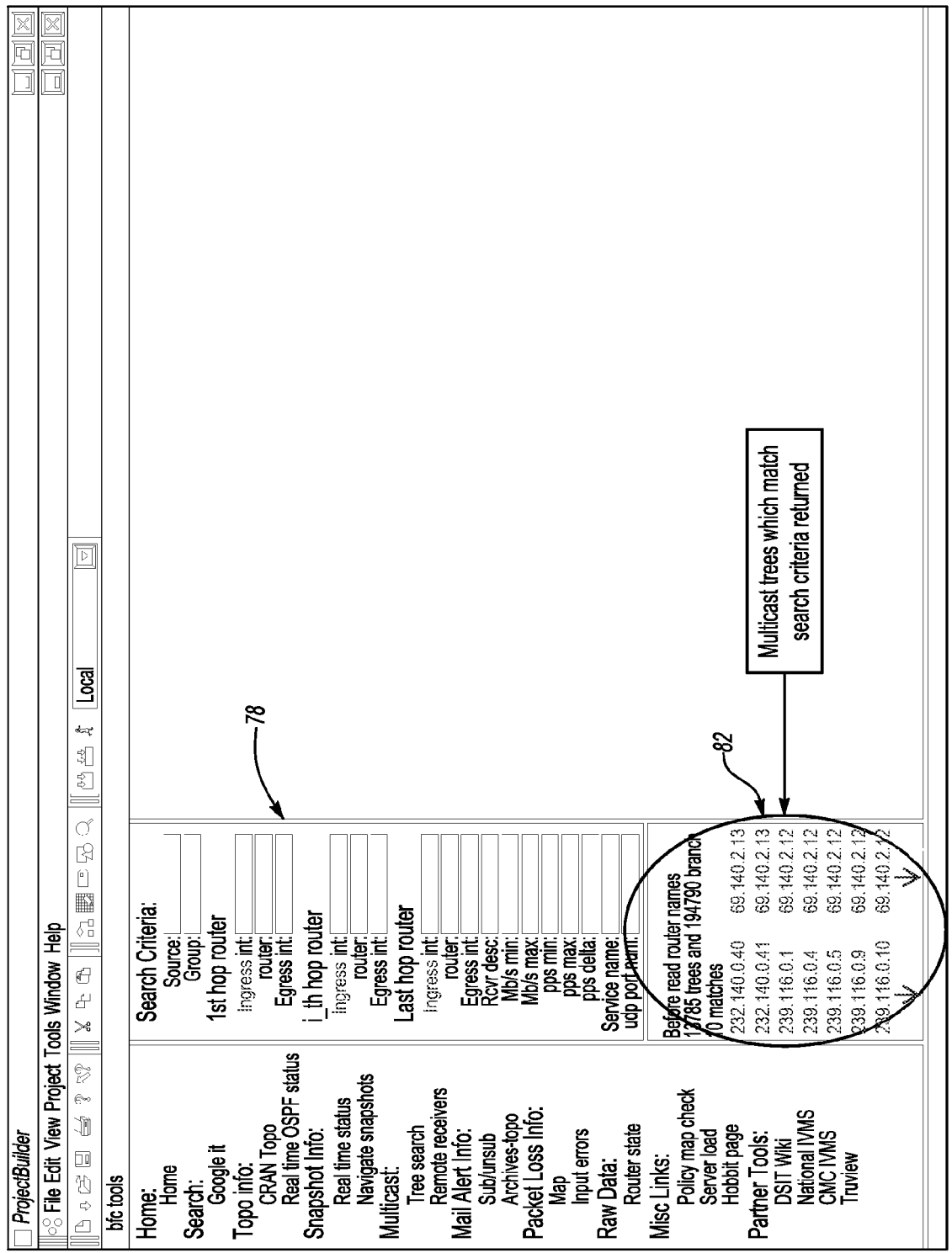
FIG. 4 depicts an illustrative screen display that identifies search results based on a search of multicast trees, in accordance with one or more aspects of the disclosure.

FIG. 4 depicts an example screen display 80, that may be displayed by client 58, that provides example search results (labeled in FIG. 4 as element 82) to the user. Screen display 80 may be displayed as a result of performing the search on the search criteria entered into fields 78 from screen display 75. The search results 82 in this example may include one or more IP addresses each identifying one of the multicast trees 12 by their respective pair of source IP address (right column of element 82) and multicast destination group IP address (left column of element 82). The information contained in the search results 82 may be transmitted from the server 52 over the communication link 56 to the client 58 for display to the user as part of screen display 80. In the illustrated example, ten multicast trees were found to meet the search criteria entered into the search fields 78.

Figure 5:
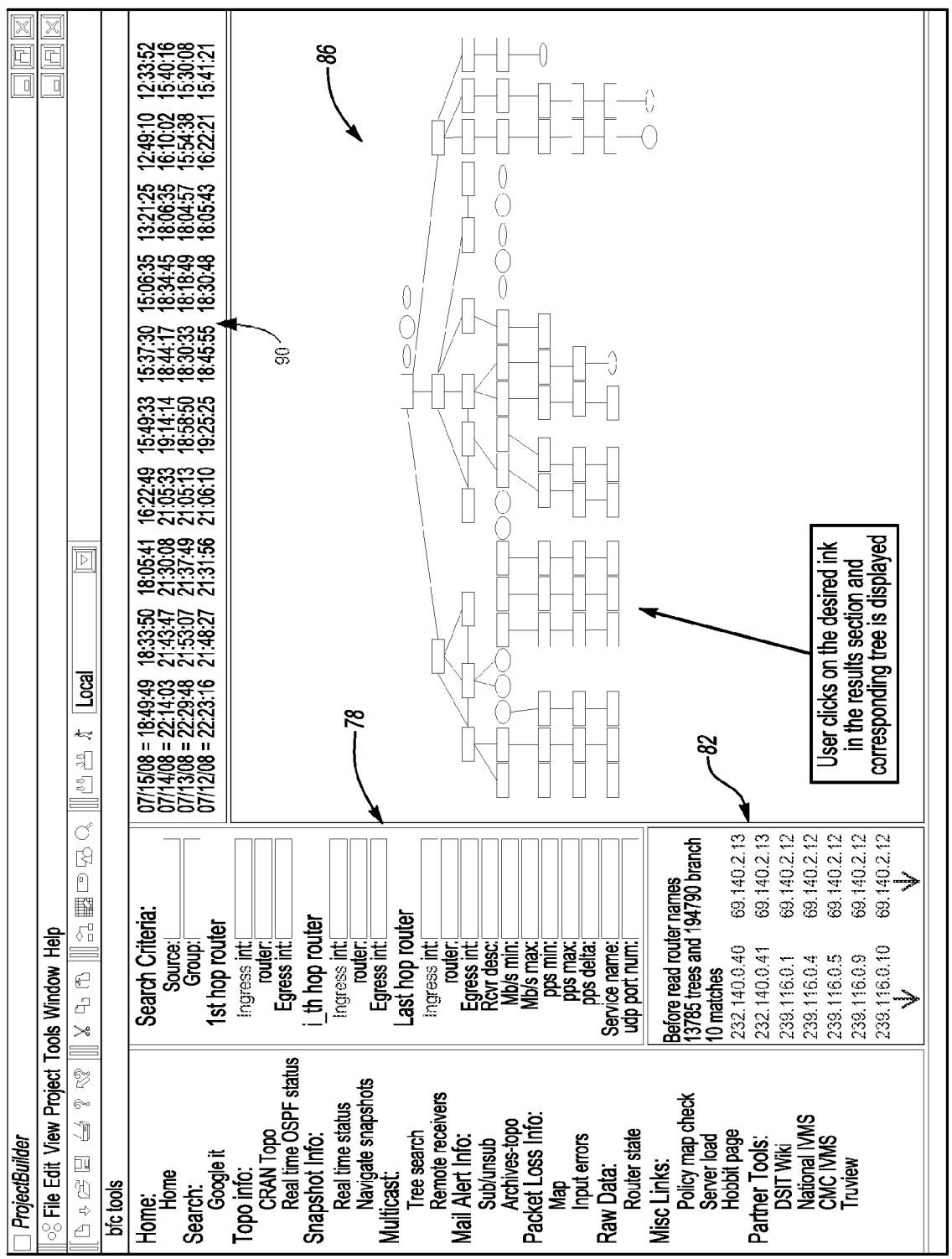
FIG. 5 depicts an illustrative screen display that provides a rendered visual representation of a multicast tree, in accordance with one or more aspects of the disclosure.

FIG. 5 depicts an example screen display 84 that may be displayed by client 58 and that provides a rendered displayed version of the logical representation 86 of one of the multicast trees selected by the user of client 58 from the displayed search results 82. Thus, screen display 84 may be presented as a result of selecting one of the search results 82 from screen display 80. It is to be noted that the displayed representation 86 may correspond to the entire logical representation of the data network 10 or to only a portion of the logical representation of the data network 10, such as only the selected multicast tree. By way of example, the screen displays of FIGS. 3-5 may be presented to the user in a URL based format. Once the representation 86 is displayed, the user may interact with the representation 86 such as by zooming into the representation 86 to see greater detail.

FIG. 5 also shows that the displayed screen 84 may further indicate various times at which the attributes were collected for the selected multicast tree. These times, which may be considered indicative of snapshots of the multicast tree at various times, are indicated as element 90. For example, in FIG. 5, it can be seen that snapshots are available for various times including on Jul. 15, 2008 at 18:49:49 and at 13:33:50, and on Jul. 14, 2008 at 22:14:03. The user may select any of the displayed times and view the selected multicast tree as it existed at the selected time, based on the attributes collected for (e.g., at or near) that time. This ability to view the multicast tree at different times may make troubleshooting even more efficient.

Figure 7:
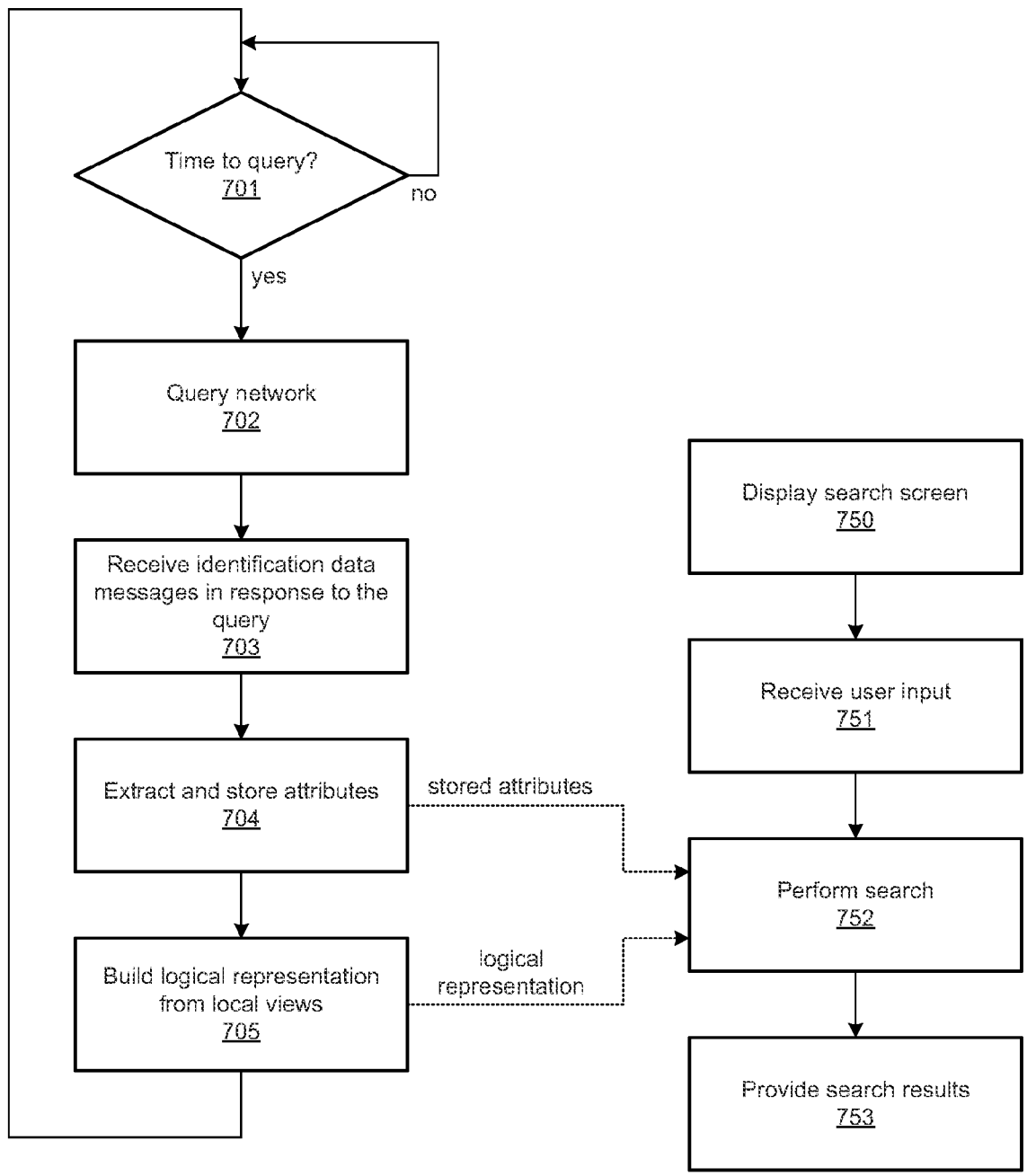
FIG. 7 is a flow chart showing an illustrative method for obtaining attributes and logical representations of the multicast trees of the network, and for performing searches on those attributes and logical representations, in accordance with one or more aspects of the disclosure.

FIG. 7 is a flowchart showing an illustrative method that may be performed in connection with collecting attributes (such as attributes 14), generating logical representations (such as logical representation 60), and performing a search. Steps 701-705, 752, and 753 may be performed by, e.g., server 52 and/or another computer, and steps 750 and 751 may be performed by, e.g., client 58 and/or another user device. This is merely one example; in other embodiments the steps may be performed by other elements of system 50. Referring to the flowchart of FIG. 7, in step 701, a determination is made by, e.g., server 52, whether it is time to query a network (e.g., network 10) to obtain identification data. As discussed previously, this query may be performed on a periodic basis. However, the querying may be performed on any regular, irregular, and/or random time basis as desired. If it is decided that it is time to query, then, as shown in step 702, a query is made (e.g., by server 52) of at least some, and possibly all, devices and/or systems in the network (e.g., routers 18 in network 10).

In step 703, in response to the queries, each of the queried devices (e.g., routers 18) returns its respective identification data that may include attributes for that device and/or local view information for that device as discussed previously. The query may specify which attributes are to be included in the identification data. The identification data may be in the form of, e.g., one or more data packets that are in turn logically arranged as messages comprising one or more of those data packets. The data packets may be dedicated to providing the identification data or the packets may also include additional data or other content. As also discussed previously, in alternative embodiments, steps 701 and 702 may be skipped altogether, and instead the identification data may be sent (e.g., periodically) by the devices (e.g., routers 18), even in the absence of a query.

Next, in step 704, the attributes 14 for each device (e.g., router 18) may be extracted (by, e.g., server 52) from the identification data and stored as data in a computer-readable storage medium, such as in database 54. In step 705, server 52 (for example) may also build the logical representation (e.g., the previously-discussed logical representation 10) of the network or of a portion of network, and may store the logical representation in a computer-readable medium, such as in database 54.

The process may also include steps 750-753, which may run independently of steps 701-705. In step 750, a display search screen may be presented (e.g., by client 58), such as the screen shown in FIG. 3. The screen may be displayed on, e.g., display 606 of client 58. In step 751, a user input may be received (such as via keyboard 605 or other input device of client 58). The user input may include, for instance, text input of search criteria into search fields 78. The user input may be provided to server 52, such as via link 56.

Next, in step 752, a search of the stored attributes may be performed (e.g., by server 52) for the input search criteria, and it may be determined which portions of the network have attributes meeting the search criteria. Correlating this search result with the logical representation 60, for example, server 52 may be able to generate search results in step 753 including an indication of which multicast trees meet the search criteria, and these search results may be passed to client 58 for storage and/or presentation to the user. The search results may be provided, for example, on a screen such as that shown in FIG. 4 or 5, which have been previously discussed.

Thus, a system, method, and software have been described for collecting attributes about a network as well as the network structure, performing a search on those attributes, and presenting search results correlated to various multicast trees in the network. Such attribute searching may potentially make network troubleshooting easier.

While various illustrative embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the multicast trees have been described by way of example as multicasting streamed A/V data, the multicast trees may be used to stream or otherwise provide other types of data in addition to or instead of A/V data, such as voice data, text messages, or data files in general.

What is claimed is:

1. A method, comprising:
    receiving data from a plurality of components in a network, the components being arranged as a plurality of multicast trees, the data from the plurality of components indicating a structure of at least a portion of the network and attributes that are associated with the components;
    receiving at least one search criterion, wherein the at least one search criterion specifies a particular quantitative difference between one or more of the attributes that are associated with different ones of the components; and
    determining, based on the data, which one or more of the plurality of multicast trees meet the at least one search criterion.

2. The method of claim 1, wherein at least one of the attributes is an attribute chosen from the following attributes: a data rate as measured at one of the components, an error rate as measured at one of the components, and a packet rate as measured at one of the components, and wherein the at least one search criterion specifies at least one rate chosen from the following rates: a data rate, an error rate, and a packet rate.

3. The method of claim 1, wherein the at least one search criterion specifies a particular one or more of the attributes as being associated with a particular one or more of the components.

4. The method of claim 1, wherein said determining comprises comparing the at least one search criterion with one or more of the attributes and with information not represented by any of the attributes.

5. The method of claim 1, wherein the at least one search criterion specifies a particular path structure, and wherein said determining which one or more of the multicast trees meet the at least one search criterion comprises determining which one or more of the multicast trees has a structure consistent with the particular path structure.

6. The method of claim 1, further comprising determining a structure of at least some of the multicast trees, wherein the data from each of at least some of the components represents a local view of the structure of the at least a portion of the network from a point of view of the respective component, and wherein said determining the structure of the at least some of the multicast trees comprises combining the local views.

7. The method of claim 1, wherein said determining comprises determining which one or more of the plurality of multicast trees has at least the particular quantitative difference between the attributes.

8. The method of claim 1, wherein the particular quantitative difference comprises a predetermined value of a difference in packet rates across at least some of the components.

9. A method, comprising:
receiving data from a plurality of components in a network, the components being arranged as a plurality of multicast trees, the data from the plurality of components indicating a structure of at least a portion of the network and attributes that are associated with the components;
receiving at least one search criterion; and
determining, based on the data, which one or more of the plurality of multicast trees meet the at least one search criterion,
wherein said determining comprises comparing at least a portion of the at least one search criterion with one or more of the attributes and comparing at least another portion of the at least one search criterion with information not represented by any of the attributes.

10. The method of claim 9, wherein at least one of the attributes is an attribute chosen from the following attributes: a data rate as measured at one of the components, an error rate as measured at one of the components, and a packet rate as measured at one of the components, and wherein the at least one search criterion specifies at least one rate chosen from the following rates: a data rate, an error rate, and a packet rate.

11. The method of claim 9, wherein the at least one search criterion specifies a particular one or more of the attributes as being associated with a particular one or more of the components.

12. The method of claim 9, wherein the at least one search criterion specifies a particular path structure, and wherein said determining which one or more of the multicast trees meet the at least one search criterion comprises determining which one or more of the multicast trees has a structure consistent with the particular path structure.

13. The method of claim 9, further comprising determining a structure of at least some of the multicast trees, wherein the data from each of at least some of the components represents a local view of the structure of the network from a point of view of the respective component, and wherein said determining the structure of the at least some of the multicast trees comprises combining the local views.

14. A method, comprising:
receiving data from a plurality of components in a network, the components being arranged as a plurality of multicast trees, the data from the plurality of components indicating a structure of at least a portion of the network and attributes that are associated with the components;
receiving at least one search criterion;
determining, based on the data, which one or more of the plurality of multicast trees meet the at least one search criterion; and
determining, based on the data, a structure of at least some of the plurality of multicast trees, wherein the at least one search criterion specifies a particular path structure, and wherein said determining which one or more of the plurality of multicast trees meet the at least one search criterion comprises determining which one or more of the plurality of multicast trees have a structure consistent with the particular path structure.

15. The method of claim 14, wherein the data from each of at least some of the components represents a local view of the structure of the at least a portion of the network from a point of view of the respective component, and wherein said determining the structure of the at least some of the multicast trees comprises combining the local views.

16. The method of claim 14, wherein at least one of the attributes is an attribute chosen from the following attributes: a data rate as measured at one of the components, an error rate as measured at one of the components, and a packet rate as measured at one of the components, and wherein the at least one search criterion specifies at least one rate chosen from the following rates: a data rate, an error rate, and a packet rate.

17. The method of claim 14, wherein the at least one search criterion specifies a particular one or more of the attributes as being associated with a particular one or more of the components.

18. The method of claim 14, wherein the particular path structure comprises a particular source network address, and wherein said determining which one or more of the plurality of multicast trees meet the at least one search criterion comprises determining which one or more of the plurality of multicast trees comprise the particular source network address.

19. The method of claim 14, wherein the particular path structure comprises a particular component interface, and wherein said determining which one or more of the plurality of multicast trees meet the at least one search criterion comprises determining which one or more of the plurality of multicast trees uses the particular component interface.

20. The method of claim 14, wherein the particular path structure comprises a particular location of a particular component within one of the multicast trees, and wherein said determining which one or more of the plurality of multicast trees meet the at least one search criterion comprises determining which one or more of the plurality of multicast trees has the particular component at the particular location within the respective multicast tree.

* * * * *

UNITED STATES PATENT AND TRADEMARK OFFICE
CERTIFICATE OF CORRECTION

| | | |
|---|---|---|
| PATENT NO. | : 8,599,725 B2 | Page 1 of 1 |
| APPLICATION NO. | : 13/029485 | |
| DATED | : December 3, 2013 | |
| INVENTOR(S) | : Brian E. Field et al. | |

It is certified that error appears in the above-identified patent and that said Letters Patent is hereby corrected as shown below:

In the Specification

Column 4, Detailed Description, Line 60:
    Delete "14" and insert --12a-12n--

Column 6, Detailed Description, Line 63:
    Delete "12" and insert --18--

Column 6, Detailed Description, Line 65:
    Delete "12" and insert --18--

Column 7, Detailed Description, Line 1:
    Delete "12" and insert --18--

Signed and Sealed this
Seventh Day of April, 2015

Michelle K. Lee
*Director of the United States Patent and Trademark Office*